United States Patent
Steigerwald et al.

(10) Patent No.: US 9,904,700 B2
(45) Date of Patent: Feb. 27, 2018

(54) METHOD AND APPARATUS FOR GUARANTEEING AND OPTIMIZING DATA EXCHANGE IN MOBILE M2M COMMUNICATION WITH RESTRICTED CONNECTIVITY

(71) Applicant: Deutsche Telekom AG, Bonn (DE)

(72) Inventors: Wolfgang Steigerwald, Berlin (DE); Frank Mildner, Weiterstadt (DE); Ingo Friese, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 280 days.

(21) Appl. No.: 14/742,733

(22) Filed: Jun. 18, 2015

(65) Prior Publication Data

US 2015/0370841 A1  Dec. 24, 2015

(30) Foreign Application Priority Data

Jun. 20, 2014  (EP) .................................... 14173255

(51) Int. Cl.
| | |
|---|---|
| G06F 17/30 | (2006.01) |
| H04W 4/00 | (2018.01) |
| H04L 29/08 | (2006.01) |
| H04W 40/22 | (2009.01) |
| H04L 29/14 | (2006.01) |
| H04W 84/20 | (2009.01) |

(52) U.S. Cl.
CPC .. *G06F 17/30336* (2013.01); *G06F 17/30371* (2013.01); *H04L 67/2857* (2013.01); *H04W 4/006* (2013.01); *H04L 69/40* (2013.01); *H04W 40/22* (2013.01); *H04W 84/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0278280 | A1* | 12/2005 | Semerdzhiev | .... G06F 17/30067 |
| 2011/0320746 | A1* | 12/2011 | Pugsley | ............ G06F 17/30946 |
| | | | | 711/154 |

* cited by examiner

*Primary Examiner* — Etienne P Leroux
(74) *Attorney, Agent, or Firm* — Leydig, Voit & Mayer, Ltd.

(57) ABSTRACT

A method for transmitting data from a mobile unit to a backend system includes, when connectivity is present between the mobile unit and the backend system: receiving, by the mobile unit, a master index from the backend system, deleting, by the mobile unit, data of the local database which are contained in the master database based on a comparison of a local index with the master index and updating the local index, transmitting, by the mobile unit, data stored in the local database which are not yet contained in the master database, receiving and storing a new master index from the backend system, and deleting the transmitted data of the local database based on a comparison of the updated local index with the new master index and further updating the local index.

18 Claims, 5 Drawing Sheets

METHOD AND APPARATUS FOR GUARANTEEING AND OPTIMIZING DATA EXCHANGE IN MOBILE M2M COMMUNICATION WITH RESTRICTED CONNECTIVITY

CROSS-REFERENCE TO RELATED APPLICATIONS

Priority is claimed to European Patent Application No. EP 14 17 3255.2, filed on Jun. 20, 2014, the entire disclosure of which is hereby incorporated by reference herein.

FIELD

The present invention relates generally to the field of mobile M2M communication, in particular with restricted connectivity for guaranteeing and optimizing data transfer.

BACKGROUND

Mobile processes are often monitored and controlled by means of data analysis and process control in the cloud.

A prerequisite for this is a mobile M2M communication based on the connectivity between mobile process elements (peers) and the backend for ensuring data transmission from the peers (data sources) to the backend (data sink) and for message transmission from the backend to the peers.

Conventional methods function only with online connectivity with high bandwidth, e.g., based on public 3/4G mobile communication networks.

If the connectivity to the backend is missing or if the bandwidth is too small, no data transmission to the backend or message transmission to the peers and thus no control and data analysis is possible in processes.

SUMMARY

In an embodiment, the invention provides a method for transmitting data from a mobile unit to a backend system. The mobile unit comprises a local database for storing data corresponding to the mobile unit. The mobile unit is configured to generate a local index based on the stored data corresponding to the mobile unit. The backend system comprises a master database for storing data received from at least one mobile unit. The backend system is configured to generate a master index based on the stored data received from the at least one mobile unit. The method comprises, when connectivity is present between the mobile unit and the backend system: receiving, by the mobile unit, the master index from the backend system, deleting, by the mobile unit, the data of the local database which are contained in the master database based on a comparison of the local index with the master index and updating the local index, transmitting, by the mobile unit, data stored in the local database which are not yet contained in the master database, receiving and storing a new master index from the backend system, and deleting the transmitted data of the local database based on a comparison of the updated local index with the new master index and further updating the local index.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

By further automation in the so-called industry 4.0, it must be expected that the data volume between backend and peers becomes higher and higher. However, it is necessary to reduce the data volume to be transmitted in order to effectively use short accessibility time slots.

Thus, the transmission of large redundant data volumes caused by missing coordination becomes more and more problematic and inevitably leads to process interruptions. Moreover, so-called secondary monitoring damage can occur because only in case of a connectivity of all mobile units, the current mobile production processes can operate smoothly.

In an embodiment, the present invention provides a method and an apparatus which provide an alternative data exchange in case of restricted or missing connectivity of the mobile units to the backend and/or in case the bandwidth is too small for data transmission.

In an embodiment, the present invention provides for data replication and synchronization between the peers via an ad-hoc network. The method and the apparatus of the present invention are supported by a specific protocol for minimizing and organizing the data volume to be transmitted between peers and between peers and backend. Moreover, both backend processes and peer processes are provided for data management.

The present invention provides a method for transmitting data from at least one mobile unit, in particular from at least one peer, to a backend system if restricted connectivity is present between the mobile unit and the backend system, wherein the mobile unit comprises a local database for storing own data and preferably for buffering data of at least one further mobile unit. The mobile unit generates a local index according to the stored own data and preferably the buffered data, wherein the backend system comprises a master database for storing received data of at least one mobile unit, wherein the backend system generates a master index according to the stored data, wherein the method carries out the following steps if connectivity is present between the at least one mobile unit and the backend system:

Receiving the master index from the backend system; deleting the data of the local database which are contained in the master database on the basis of a comparison of the local index with the master index and updating the local index; transmitting data which are stored in the local database and which are not yet contained in the master database; receiving and storing a new master index from the backend system; and deleting the previously transmitted data of the local database on the basis of a comparison of the updated local index with the new master index and newly updating the local index.

Moreover, the present invention provides a method for receiving data from at least one mobile unit, in particular from at least one peer, at a backend system if restricted connectivity is present between the mobile unit and the backend system, wherein the backend system comprises a master database for storing received data from at least one mobile unit. Moreover, the backend system provides a master index according to the stored data, wherein the method carries out the following steps if connectivity is present between the at least one mobile unit and the backend system: Transmitting the master index to the mobile unit; receiving new data which are not contained in the master database from the mobile unit; storing the new data in the master database; updating the master index via the data stored in the master database; and transmitting the new master index to the mobile unit.

The present invention further provides a method for transmitting data from at least one mobile unit, in particular from at least one peer, to a backend system if restricted connectivity is present between the mobile unit and the backend system, wherein the mobile unit comprises a local database for storing own data and preferably for buffering data of at least one further mobile unit. The mobile unit generates a local index according to the stored own data and preferably the buffered data, wherein the backend system comprises a master database for storing received data from at least one mobile unit, wherein the backend system generates a master index according to the stored data, wherein, if connectivity is present between the at least one mobile unit and the backend system, the method carries out the above-mentioned steps of the method for transmitting data and also the steps of the method for receiving data.

In a further aspect, the present invention provides a method for exchanging data intended for a backend system between at least two mobile units, in particular between at least two peers, if restricted connectivity is present between the mobile units and the backend system, wherein the mobile units each comprise a local database for storing own data and preferably for buffering data of at least one further mobile unit. The mobile units each generate a local index according to the stored own data and preferably the buffered data, wherein the mobile units each have a master index according to the stored data of the backend system at the time of the last data exchange between the respective mobile unit and the backend system, wherein the method carries out the following steps if there is no connectivity between the at least two mobile units and the backend system: Setting-up an ad-hoc network between the at least two mobile units; exchanging the master indexes and the local indexes; deleting the older one of the respective master indexes and storing the more current master index; deleting the data from the local databases of the mobile units which have already been sent to the backend on the basis of a comparison of the current master index with the local indexes, and updating the respective local indexes; updating the local indexes about the data stored in the local database of the respective local unit; and transmitting additional data present in the local databases of the mobile units to the respective other mobile unit so that the local databases comprise identical data which have not yet been sent to the backend and newly updating the respective local indexes.

In a further aspect of the present invention, a method is provided for transmitting data from at least two mobile units, in particular at least two peers, to a backend system if restricted connectivity is present between the mobile units and the backend system, wherein the backend system generates a master index according to the stored data, wherein the mobile units each comprise a local database for storing own data and preferably for buffering data of at least one further mobile unit. The mobile units each generate a local index according to the stored own data and preferably the buffered data, wherein the mobile units each have a master index according to the stored data of the backend system at the time of the last data exchange between the respective mobile unit and the backend system, wherein, if connectivity is present between the at least one mobile unit and the backend system, the method carries out the above-mentioned steps for transmitting and receiving in case connectivity is present and wherein, if no connectivity is present between at least one mobile unit and the backend system, the method carries out the above-mentioned steps for exchanging data.

The master index of the backend system and the local index of the mobile unit are preferably stored in an acknowledgement file.

The ad-hoc network between the mobile units is preferably established or set-up via WLAN or non-licensed ISM bands (industry, scientific, medical).

In a further aspect, the present invention provides a method for transmitting messages from a backend system to at least one mobile unit, in particular at least one peer, if restricted connectivity is present between the mobile unit and the backend system, wherein the mobile unit comprises a local database for storing messages and preferably for buffering messages to at least one further mobile unit. The mobile unit generates a local index according to the locally stored messages and preferably the buffered messages, wherein the mobile unit generates a reception index according to the already received messages to the mobile unit and preferably stores at least one further reception index of at least one further mobile unit, wherein the backend system comprises a master database for storing messages to at least one mobile unit. The backend system generates a master index according to the already transmitted messages, wherein the method carries out the following steps if connectivity is present between the at least one mobile unit and the backend system: Transmitting the master index to the mobile unit connected to the backend system; receiving at least one reception index and the local index; deleting all already received messages from the master database of the backend system as based on the at least one reception index; transmitting messages which have not yet been received by the at least one mobile unit; receiving an updated reception index from the mobile unit connected to the backend system; deleting the above-mentioned transmitted messages from the master database based on the received updated reception index; and updating the master index of the backend system.

Moreover, a method is provided for receiving messages from a backend system to at least one mobile unit, in particular at least one peer, if restricted connectivity is present between the mobile unit and the backend system, wherein the mobile unit comprises a local database for storing messages and preferably for buffering messages to at least one further mobile unit. The mobile unit generates a local index according to the locally stored messages and preferably the buffered messages, wherein the mobile unit generates a reception index according to the already received messages to the mobile unit and preferably stores at least one further reception index of at least one further mobile unit, wherein the backend system comprises a master database for storing messages to at least one mobile unit. The backend system generates a master index according to the already transmitted messages, wherein the method carries out the following steps if connectivity is present between the at least one mobile unit and the backend system: Receiving the master index of the backend system; deleting the messages in the local database of the mobile unit based on the master index and updating the reception index of the mobile unit and preferably at least one further reception index of at least one further mobile unit; transmitting the local index of the mobile unit and the at least one updated reception index; receiving messages which have not yet been received by the connected mobile unit and preferably messages for at least one further mobile unit which have not yet been received by the mobile unit; storing the received messages; updating the reception index and the local index of the mobile unit; and transmitting the updated reception index and the local index of the mobile unit to the backend system.

In a further aspect of the present invention, a method is provided for transmitting messages from a backend system to at least one mobile unit, in particular to at least one peer, if restricted connectivity is present between the backend system and the mobile unit, wherein the mobile unit comprises a local database for storing messages and preferably for buffering messages to at least one further mobile unit. The mobile unit generates a local index according to the locally stored messages and preferably the buffered messages, wherein the mobile unit generates a reception index according to the already received messages to the mobile unit and preferably stores at least one further reception index of at least one further mobile unit, wherein the backend system comprises a master database for storing messages to at least one mobile unit. The backend system generates a master index according to the already transmitted messages, wherein, if connectivity is present between the at least one mobile unit and the backend system, the method carries out the above-mentioned steps for transmitting as well as for receiving messages.

According to a further aspect, the present invention provides a method for exchanging messages between a backend system and at least two mobile units, in particular at least two peers, if restricted connectivity is present between the mobile units and the backend system, wherein the mobile unit comprises a local database for storing messages and preferably for buffering messages to at least one further mobile unit. The mobile unit generates a local index according to the locally stored messages and preferably the buffered messages, wherein the mobile unit generates a reception index according to the already received messages to the mobile unit and preferably stores at least one further reception index of at least one further mobile unit. The mobile units each have a master index of the backend system according to the already received messages at the time of the last message exchange between the respective mobile unit and the backend system, wherein the method carries out the following steps if no connectivity is present between the at least one mobile unit and the backend system: Setting-up an ad-hoc network between the at least two mobile units; exchanging the local indexes, the master indexes and the reception indexes; deleting the older reception index and the older master index and storing the more current reception index and the more current master index; updating the locally stored messages based on the current master index and the current reception index; and transmitting messages additionally present in the local databases of the mobile units to the respective other mobile unit.

In a further aspect, a method is provided for transmitting messages from a backend system to at least two mobile units, in particular to at least two peers, if restricted connectivity is present between the backend system and the mobile units, wherein the backend system comprises a master database for storing messages to at least one mobile unit. The backend system generates a master index according to the already transmitted messages, wherein the mobile unit comprises a local database for storing messages and preferably for buffering messages to at least one further mobile unit. The mobile unit generates a local index according to the locally stored messages and preferably the buffered messages, wherein the mobile unit generates a reception index according to the already received messages to the mobile unit and preferably stores at least one further reception index of at least one further mobile unit. The mobile units each have a master index of the backend system according to the already received messages at the time of the last message exchange between the respective mobile unit and the backend system, wherein, if connectivity is present between at least one mobile unit and the backend system, the method carries out the above-mentioned steps for receiving and also the above-mentioned steps for transmitting and wherein, if no connectivity is present between at least one mobile unit and the backend system, the method carries out the above-mentioned steps for exchanging messages.

In a further aspect, an apparatus is provided for transmitting data or messages between at least two mobile units, in particular at least two peers, and/or a backend system, if restricted connectivity is present between the backend system and the mobile units, in particular in accordance with any one of the above-mentioned methods, wherein the mobile units comprise the following components: a local database, a transmitting and receiving unit, a data exchange management unit, and an acknowledgement file unit.

The acknowledgement file unit is preferably suitable for storing information about the data stored in the local database of the mobile unit in the form of a local index and also for storing information about the data stored in a database of the backend system in the form of a master index.

The local database of the mobile units is preferably suitable for storing own data and preferably for buffering data of at least one further mobile unit to the backend system.

Moreover, the data exchange management unit of the mobile units is suitable for generating the local index according to the stored own data and preferably the buffered data.

The data exchange management unit is preferably suitable for reading out both the local index and the master index.

According to a further aspect of the present invention, the data exchange management unit is suitable for deleting data from the local database of the mobile units based on the content of the master index.

The acknowledgement file unit is further suitable for storing information about the messages stored in the local database of the mobile unit for other mobile units in the form of a local index, information about already received messages of the mobile unit and preferably information about already received messages of at least one further mobile unit in the form of reception indexes, and information about the messages present in a database of the backend system in the form of a master index.

The data exchange management unit is further suitable for generating the reception index for the respective mobile unit.

The data exchange management unit is preferably suitable for generating the local index for the respective mobile unit.

The data exchange management unit is further suitable for reading out the local index, the reception indexes and the master index.

According to a further aspect of the present invention, an apparatus is provided for transmitting data or messages between at least two mobile units, in particular at least two peers, and a backend system, if restricted connectivity is present between the backend system and the mobile units, in particular in accordance with any one of the methods described above, wherein the backend system comprises the following components: a master database, a transmitting and receiving unit, a data exchange management unit, and an acknowledgement file unit.

The acknowledgement file unit is preferably suitable for storing information about the data stored in the master database of the backend system in the form of a master index.

The master database of the backend system is preferably suitable for storing received data from at least one mobile unit to the backend system.

The data exchange management unit of the backend system can further be suitable for generating the master index according to the stored data.

The acknowledgement file unit is preferably suitable for generating information about the messages present in the master database of the backend system in the form of a master index.

The data exchange management unit can further be suitable for receiving and reading out at least one reception index from a mobile unit.

The data exchange management unit can further be suitable for deleting messages from the master database based on the reception indexes of the mobile units.

In other words, a method and an apparatus are provided for data management in an ad-hoc network between peers and the pick-up of the data by machines participating in the production process. According to the present invention, a self-organizing data exchange management method which knows which data are currently present in the backend of the control service in the cloud and in the local memory of the peer/machine (source) is provided.

Hence, the mobile production process can be ensured/maintained although connectivity is missing between mobile/remote stationary production sites and the data analysis/processing in the cloud.

As compared to the known methods for data exchange in mobile production processes, the method and the apparatus offers the advantages of a bidirectional transmission of data and a reduction in the data volumes to be transmitted, i.e. a reduction in the data traffic in mobile production processes.

Further advantages of the present invention are the transmission reliability, e.g., by deleting already sent/transmitted data. Moreover, an extension of the range of cloud-controlled production and logistics processes is possible by means of the present invention. Advantageous uses are moreover the fleet management or for transport companies (busses, railways) as well as the process control of task forces in disaster areas and in case of failure of public mobile networks.

Further advantages as compared to the prior art are the extension of the process range, the indirect network coverage and the process control extension for data management by means of acknowledgement protocols. The present invention can also be used for using/extending known IT processes for virtual network coverage and for ensuring and optimizing the data exchange in mobile M2M communication in case of restricted connectivity.

A further advantageous effect of the present invention is the simple handling, the use of existing protocols and the use of existing terminal equipment.

The use of the present invention allows the realization of mobile process control solutions which have not been possible so far because of missing backend connectivity. In other words, the invention allows the transfer of connectivity-based products to applications in which only restricted connectivity is present.

The present invention can be used, e.g., in system houses (also across providers), by providers and by users of mobile production processes, in mobile plants or in plants outside network coverage, by providers of mobile or remote processes, for fleet logistics or also by specific task forces. Moreover, the present invention can be used, e.g., in the so-called internet of things or for virtual network coverage for non-real time communication. Furthermore, for connection to the backend system, a base station with, e.g., satellite uplink can be used or the WLAN connection at the farm. Further applications and modifications which are covered by the scope of protection of the present invention are possible and evident to the person skilled in the art on the basis of the description and the claims.

In the following, the present invention is explained in more detail on the basis of embodiments and the Figures.

Figure 1:
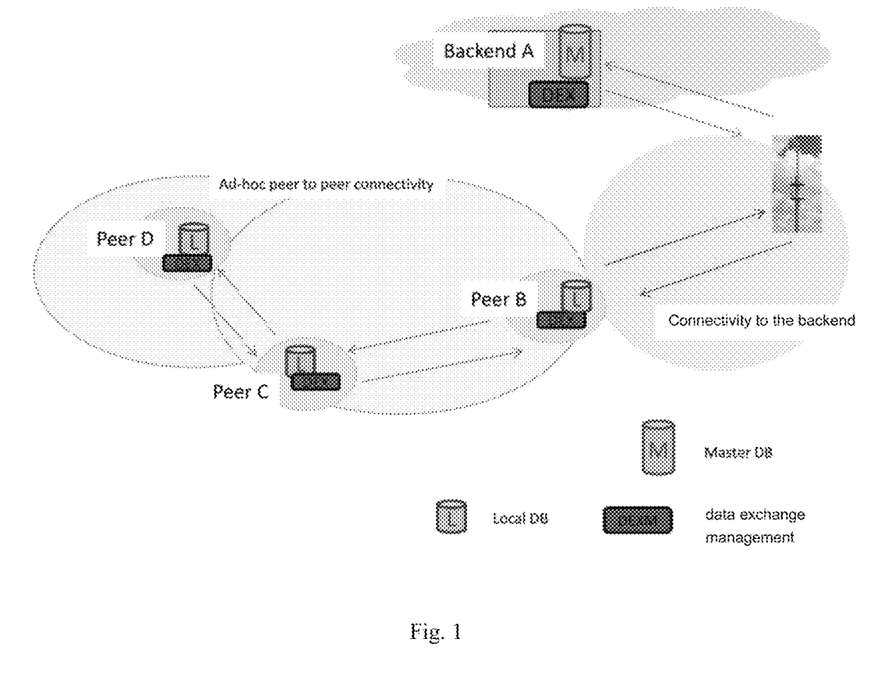
FIG. 1 schematically shows the principle basic structure of the solution of the invention and the peers participating in the process as mobile data transporters.

The arrangement forming the basis of the invention is schematically shown in FIG. 1. The principle is based, i.a., on the fact that each data source (peer) transfers its entire data to the neighbor that can be reached in the P2P network. Each peer thus also buffers the data of the other data sources/neighbors. The peers exchange among each other acknowledgements about already received data or data already transmitted to the backend (in the following also referred to as backend system). It is not necessary to transmit acknowledged data once again. If a peer gets connectivity to the backend system, it transmits its data and the data of the other peers buffered in it to the backend system. In order to minimize the data transfer, the data which have already been loaded in the master database (MDB) of the backend system are deleted in the databases of the peers (in the following also referred to as local databases (LDB)). This is realized by means of a so-called "acknowledgement protocol".

With reference to FIG. 1, peers B, C and D do not have a backend connectivity and exchange their data via one/more ad-hoc network(s) (NW) and "data exchange management processes". B thus functions as mobile data buffer, wherein the data exchange between C and B takes place via ad-hoc networks. In a next step, B changes its position, e.g., during the transportation of goods. If, on its transportation path, B reaches connectivity to the backend system, e.g., by public mobile network coverage, data are exchanged between B and the backend (A), e.g., via public networks. If B again reaches C and D on its transportation path, the state of the delivered data is synchronized and, if necessary, data are newly exchanged between the peers.

Embodiment 1: Method for Transmitting Data from the Peers to the Backend System

Figure 2:
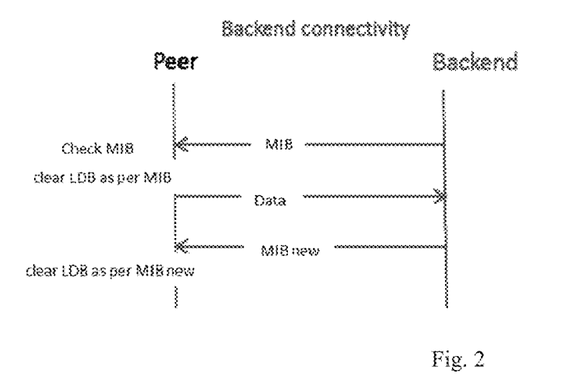
FIG. 2 shows a flow chart, if connectivity is present, for an embodiment 1.
Figure 3:
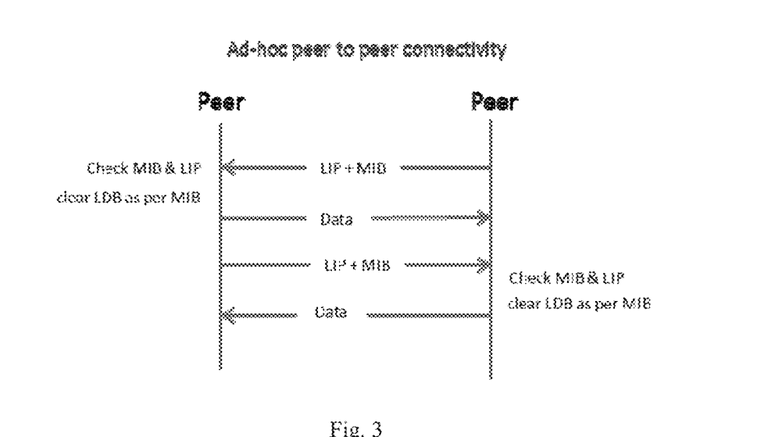
FIG. 3 shows a flow chart, if no connectivity is present, for an embodiment 1.

In the following, the method according to a first embodiment is explained on the basis of FIG. 2 and FIG. 3.

According to the present invention, if no connectivity to the backend system is present, the data are exchanged between the mobile units (peers) via mobile ad-hoc networks, e.g., WLAN or in non-licensed industry scientific medical (ISM) bands.

If connectivity is available between backend system and a mobile unit, the master index (MIB) of the master database (MDB) of the backend system is transmitted to the peer. On the basis of the MIB, the peer determines which of the collected data have to be sent to the MDB of the backend system.

In the backend system, a data exchange management service of the backend system (DEXMB) generates an MIB according to the data received by the peers in the MDB and then transmits it to the peer. The final transmission of the new MIB is simultaneously the identification for the peer that the data transmission was successful.

In the data exchange management service of the peer (DEXMP) of a peer, a local index of the peer (LIP) is generated according to the locally saved data (own data and data received/buffered from other peers).

MIB and LIP are stored in the acknowledgement file of the peer, transmitted and updated by the DEXMP and DEXMB.

In the following, the principle of the present invention for the case that connectivity is present between peer and backend system is exemplarily described on the basis of FIG. 2.

If connectivity is present between a peer and the backend system, the MIB is transmitted from the backend to the peer at the beginning of a data communication.

The DEXMP of the peer deletes all data sets already present in the backend system in its local database (LDB), based on the MIB, and then only transmits the data sets not existing in the MDB to the backend system.

After transmission, the backend system sends a new/current MIB to the peer. Based on the current MIB, the acknowledgement file and the LDB are updated and, according to the current MIB, the successfully transmitted data sets are deleted in the LDB and also the LIP is updated accordingly.

As a result, the LDB of the peer does no longer contain data sets which have already been transmitted to the backend system. The current MIB is present in the acknowledgement file.

The principle of the present invention for the case that no connectivity is present between the peers and the backend system is exemplarily described in the following on the basis of FIG. 3.

If no connectivity is present, in a first step an ad-hoc network between at least two peers is set-up. The two indexes MIB and LIB are exchanged in the acknowledgement protocol between the peers at the beginning of the data transmission.

If a peer receives an MIB, always the more current (higher) one is kept. On the basis of the MIB it is determined, which data have already been transmitted to the backend system, and, accordingly, these data can then be deleted locally and the local indexes LIPs can be updated.

On the basis of the local indexes LIPs it is determined which data must be exchanged by the peers. Then, the data are exchanged between the peers. As a result, the data sets of the two peers are synchronized.

Embodiment 1: Apparatus for Transmitting Data from the Peers to the Backend System In the following, the apparatus 10 of the present invention according to an embodiment of the present invention is exemplarily described on the basis of FIG. 4 and FIG. 5. The architecture (apparatus) consists of two main elements. On the one hand the backend system 20 and on the other hand at least two peers 30, 40.

Figure 4:
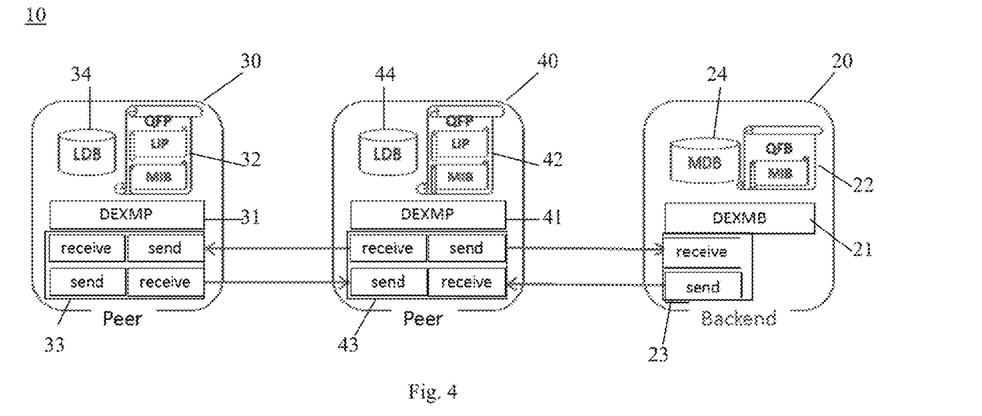
FIG. 4 schematically shows the principle basic structure of the solution of the invention for an embodiment 1.
Figure 5:
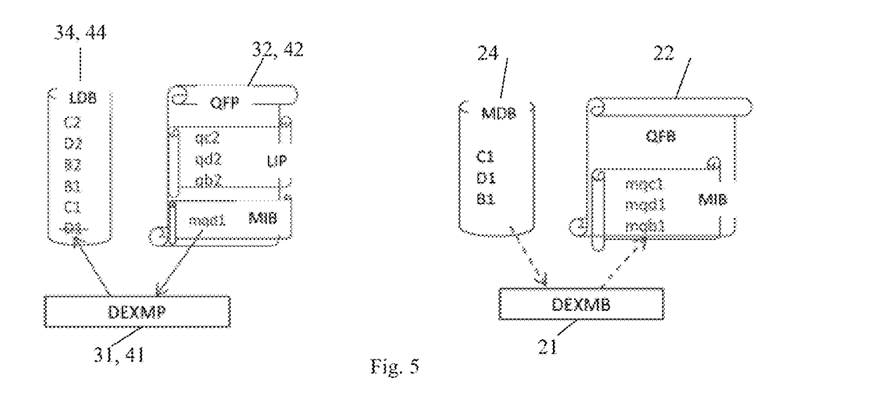
FIG. 5 schematically shows the cooperation of individual components according to FIG. 4.

The apparatus of the invention is essentially based on the data exchange service management of the backend system (DEXMB) 21 and the data exchange service management of the peer (DEXMP) 31, 41, the acknowledgement file of the backend system (QFB) 22 and the acknowledgement file of the peer (QFP) 32, 42. Moreover, the apparatus comprises transmitting and receiving modules 23, 33, 43, the master database of the backend system (MIB) 24 and the local database of the peer 34, 44.

According to FIG. 4 and FIG. 5, the peer comprises the LDB 34, 44, the DEXMP 31, 41, the transmitting and receiving module 33, 43, and the QFP 32, 42.

The DEXMP 31, 41 generates the local index LIP, deletes data according to the MIB in the LDB 34, 44, transmits data to other peers according to the LIP of the other peer and transmits data to the backend system 20.

The QFP 32, 42 comprises the LIP and a copy of the MIB. The LIP is the list of the current data sets of the peer stored in the LDB 34, 44 and of data sets received/stored from other peers.

With reference to FIG. 4 and FIG. 5, the backend system 20 comprises the MDB 24, the DEXMB 21, the transmitting and receiving module 23 and the QFB 22.

The DEXMB 21 generates the MIB and transmits the current MIB in the acknowledgement file QFB 22 to the peers and receives data from the peers.

The MIB is the list of the indexes of the data sets of the peers 30, 40 received by the backend system 20. The QFB 22 comprises the MIB.

Embodiment 2: Method for Transmitting Messages of the Backend System to the Peers In the following, the method according to a second embodiment is explained on the basis of FIG. 6 and FIG. 7. According to the present invention, if no connectivity to the backend system is present, messages are transmitted from the backend system to the peers via other peers. Between the mobile units (peers), transmission is realized via mobile ad-hoc networks, e.g., WLAN or non-licensed ISM bands.

Figure 6:
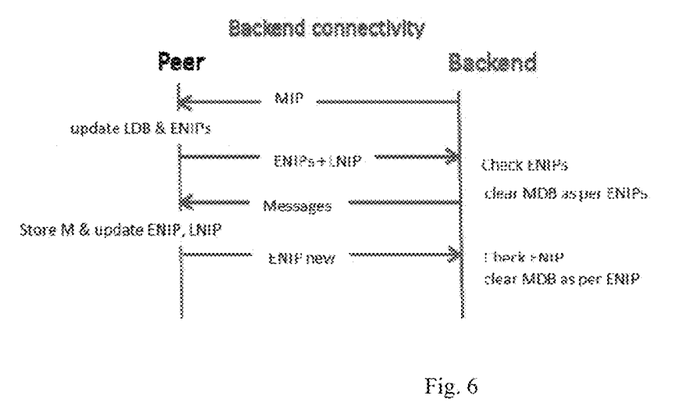
FIG. 6 shows a flow chart, if connectivity is present, for an embodiment 2.
Figure 7:
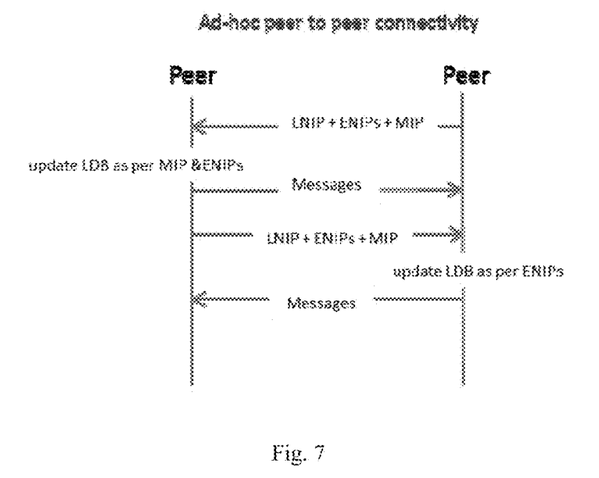
FIG. 7 shows a flow chart, if no connectivity is present, for an embodiment 2.

In the peers, the DEXMP generates a receiver message of the peer (ENIP) according to the already received messages of the backend system to the peer.

In the local DEXMP of a peer, additionally a local message index (LNIP) is generated according to the locally saved messages of the backend system for other peers.

If connectivity is available between backend and a mobile unit, the backend transmits its master index (MIP) of the messages already acknowledged by the peers to the peer, the mobile unit (peer) transmits the ENIPs and its LNIP to the backend system.

Based on the ENIPs, the backend system deletes messages already received by the receiver peers in the MDB and transmits the messages not yet received by the peers.

The ENIP and the LNIP are stored in the QFP, transmitted and updated by the DEXMP.

In the following, the principle of the present invention is exemplarily described on the basis of FIG. 6 for the case that there is connectivity between peer and backend system.

If there is connectivity between a peer and the backend system, the MIP of the reception acknowledgements is transmitted to the peer, the peer then updates its LDB and the acknowledgements of the ENIPs. Then, the updated ENIPs and the LNIP are transmitted in the acknowledgement file QFP from the peer to the backend system.

The DEXMB of the backend system deletes in its MDB, based on the ENIPs, all messages already addressed to them and received by the peers and then only transmits the messages which have not yet been acknowledged by the receiver peers and new messages to other peers which have not yet been received by this presently connected peer.

The DEXMP of the peer then updates its LNIP and updates its ENIP according to its messages from the backend system and transmits its current ENIP to the backend system. The backend system deletes its messages to this peer in the MDB and updates its MIP. As a result, messages which have already been received by the peers are no longer present in the MDB of the backend system and in the LDB.

In the following, the principle of the present invention for the case that no connectivity is present between the peers and the backend system is exemplarily described on the basis of FIG. 7.

If no connectivity is present, first an ad-hoc network is set-up between at least two peers.

Then, the MIP, the ENIPs of the peers, and the respective LNIP are exchanged in the acknowledgement protocol QFP between the peers at the beginning of a data transmission.

If a peer receives the reception message indexes ENIPs and MIP, always the more current (higher) one is kept. On the basis of the ENIPs and MIP it is determined, which messages have already been transmitted from the backend system to the respective peer; these messages can accordingly be deleted locally and the LNIP can be updated.

On the basis of the LNIPs it is determined, which buffered messages must be exchanged by the peers. Then the data are exchanged between the peers. Then the ENIPs of the two peers are updated and once again exchanged, and the LDB is updated.

As a result, messages which have already been received by the receiver peers are no longer present in the LDBs of the peers. Each peer has the same messages for other receiver peers for which ENIPs are not yet present.

Embodiment 2: Apparatus for Transmitting Messages of the Backend System to the Peers In the following, the apparatus 50 of the present invention according to a further embodiment of the present invention is exemplarily described on the basis of FIG. 8 and FIG. 9. The architecture (apparatus) 50 consists of two main elements. On the one hand the backend system 60 and on the other hand at least two peers 70, 80.

Figure 8:
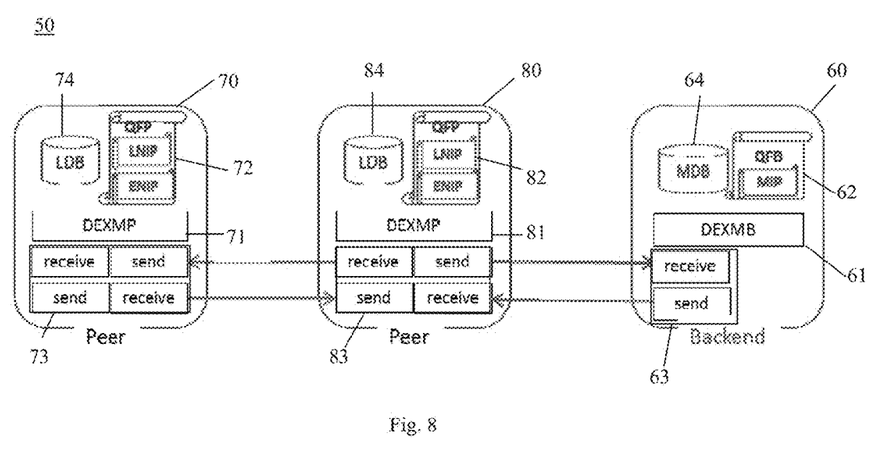
FIG. 8 schematically shows the principle basic structure of the solution of the invention for an embodiment 2.
Figure 9:
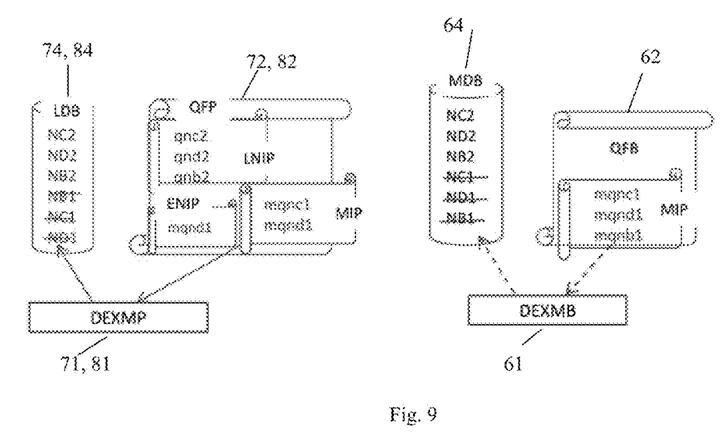
FIG. 9 schematically shows the cooperation of individual components according to FIG. 8.

Just like in the first embodiment, the apparatus consists of two main elements, the backend system 60 and the peers 70, 80.

According to FIG. 8 and FIG. 9, the apparatus of the invention further comprises the essential components, the data exchange service management of the backend system (DEXMB) 61, the data exchange service management of the peers (DEXMP) 71, 81, the acknowledgement file of the backend system QFB 62, the acknowledgement file of the peers QFP 72, 82, transmitting and receiving modules 63, 73, 83, the master database of the backend system (MDB) 64, and the local database of the peers (LDB) 74, 84.

According to FIG. 8 and FIG. 9, the peers 70, 80 comprise the LDB 74, 84, the DEXMP 71, 81, the transmitting and receiving module 73, 83, and the QFP 72, 82.

The DEXMP 71, 81 generates the receiver message index ENIP of the peers 70, 80 according to the received messages of the backend system 60 to these peers, deletes messages according to the MIP of other ENIPs, transmits messages to other peers according to the LNIP of the other peers and receives messages from the backend system 60 for the own and other target peers.

The QFP 72, 82 comprises the local index LNIP, the own ENIP and the ENIPs of the other peers and a copy of the MIP. The LNIP is the list of the current messages of the backend system 60 to other target peers 70, 80 stored in the LDB 74, 84.

The ENIP is the index of the messages received by the peer. The MIP is the master index of the messages acknowledged and received by the peers.

Moreover, the backend system 60 comprises the MDB 64 with the messages intended for the peers 70, 80, the DEXMB 61, the transmitting and receiving module 63 and the QFB 62.

The DEXMB 61 receives the ENIPs of the individual peers 70, 80 in the QFB 62, generates therefrom the MIP and deletes messages in the MDB 64 based on the MIP and transmits messages to the peers 70, 80. The MIP is the list of the ENIPs. The backend acknowledgement file QFB 62 comprises the MIP.

While the present invention has been described and shown with reference to its preferred embodiments, it is clear to persons skilled in the present field that various modifications and amendments can be made without leaving the scope of protection of the invention. In this way it is intended that the present invention covers the modifications and amendments of this invention as far as they are covered by the scope of protection of the enclosed claims and their equivalents.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for exchanging data intended for a backend system between at least two mobile units if restricted connectivity is present between the mobile units and the backend system, wherein the at least two mobile units each comprise a local database for storing data corresponding to each respective mobile unit, wherein the at least two mobile units are each configured to generate a respective local index based on the respective stored data, wherein the at least two mobile units each have a respective master index corresponding to the stored data of the backend system at the time of a last data exchange between the respective mobile unit and the backend system, wherein the method comprises, when there is no connectivity between the at least two mobile units and the backend system:
  setting up, by the at least two mobile units, an ad-hoc network between the at least two mobile units;
  exchanging, by the at least two mobile units, the respective master indexes and the respective local indexes between the at least two mobile units;
  deleting, by a first mobile unit, an older master index corresponding to the first mobile unit and storing a more current master index corresponding to a second mobile unit as an updated master index for the first mobile unit, wherein the older master index corresponding to the first mobile is older than the more current master index corresponding to the second mobile unit;
  deleting, by the first mobile unit, data from the local database of the first mobile unit which have already been sent to the backend system, based on a comparison of the more current master index with the local index of the first mobile unit;
  updating, by the first mobile unit, the local index of the first mobile unit in the local database of the first mobile unit; and
  transmitting, by the at least two mobile units, additional data present in the respective local databases of the at least two mobile units to one or more respective other mobile units so that the local databases of each of the at least two mobile units comprise identical data which have not yet been sent to the backend system; and
  further updating, by the at least two mobile units, the respective local indexes of the at least two mobile units.

2. The method according to claim 1, wherein the backend system comprises a master database for storing data received from the at least two mobile units, wherein the backend system is configured to generate a master index based on the stored data received from the at least two mobile units, wherein the method further comprises, when connectivity is present between the first mobile unit and the backend system:
  receiving, by the first mobile unit, the master index from the backend system,
  deleting, by the first mobile unit, the data of the local database of the first mobile unit which are contained in the master database based on a comparison of the local index of the first mobile unit with the master index;
  updating, by the first mobile unit, the local index of the first mobile unit;
  transmitting, by the first mobile unit, data stored in the local database of the first mobile unit which are not yet contained in the master database of the backend system;
  receiving and storing, by the first mobile unit, a new master index from the backend systems;
  deleting, by the first mobile unit, the transmitted data of the local database of the first mobile unit based on a comparison of the updated local index of the first mobile unit with the new master index; and
  further updating, by the first mobile unit, the local index of the first mobile unit.

3. The method according to claim 2, wherein the master index of the backend system and the local index of the first mobile unit are stored in an acknowledgement file.

4. The method according to claim 1, wherein the backend system comprises a master database for storing data received from the at least two mobile units, wherein the backend system is configured to generate a master index based on the stored data from the at least two mobile units, wherein the method further comprises, when connectivity is present between the first mobile unit and the backend system:
  transmitting, by the backend system, the master index to the first mobile unit;
  receiving, by the backend system, new data which are not contained in the master database from the first mobile unit;
  storing, by the backend system, the new data in the master database;
  updating, by the backend system, the master index based on the new data stored in the master database; and
  transmitting, by the backend system, the new master index to the first mobile unit.

5. The method according to claim 4, wherein the master index of the backend system and the local index of the first mobile unit are stored in an acknowledgement file.

6. The method according to claim 1, wherein a master index of the backend system and the local indexes of the at least two mobile units are stored in an acknowledgement file.

7. The method according to claim 1, wherein the ad-hoc network between the mobile units is set up via a wireless local area network (WLAN) or non-licensed industry, scientific, medical (ISM) bands.

8. The method according to claim 1, wherein the at least two mobile units are each configured to generate a respective reception index according to already received messages, wherein the backend system comprises a master database for storing messages corresponding to the at least two mobile units, wherein the backend system is configured to generate a master index according to already transmitted messages, wherein the method further comprises, when connectivity is present between the at least two mobile units and the backend system:
  receiving, by the first mobile unit, the master index of the backend system;
  deleting, by the first mobile unit, messages in the local database of the first mobile unit based on the master index;
  updating, by the first mobile unit, the reception index of the first mobile unit;
  transmitting, by the first mobile unit, the local index of the first mobile unit and the updated reception index;
  receiving, by the first mobile unit, messages which have not yet been received by the first mobile unit;
  storing, by the first mobile unit, the received messages;
  updating, by the first mobile unit, the reception index and the local index of the first mobile unit; and
  transmitting, by the first mobile unit, the updated reception index and the local index of the first mobile unit to the backend system.

9. The method according to claim 1, wherein the at least two mobile units are each configured to generate a respective reception index according to already received messages, wherein the backend system comprises a master database for storing messages corresponding to the at least two mobile unit, wherein the backend system is configured to generate a master index according to already transmitted messages, wherein the method further comprises, when connectivity is present between the at least two mobile units and the backend system:
  transmitting, by the backend system, the master index to the first mobile unit;
  receiving, by the backend system, the reception index of the first mobile unit and the local index of the first mobile unit;
  deleting, by the backend system, messages already received by the first mobile unit from the master database of the backend system based on the reception index of the first mobile unit;
  transmitting, by the backend system, messages which have not yet been received by the first mobile unit to the first mobile unit;
  receiving, by the backend system, an updated reception index of the first mobile unit from the first mobile unit;
  deleting by the backend system, the transmitted messages from the master database based on the received updated reception index of the first mobile unit; and
  updating, by the backend system, the master index of the backend system.

10. A method for exchanging messages between a backend system and at least two mobile units if restricted connectivity is present between the mobile units and the backend system, wherein each mobile unit comprises a local database for storing messages, wherein each mobile unit is configured to generate a local index according to the locally stored messages, wherein each mobile unit is configured to generate a reception index according to already received messages, wherein the at least two mobile units each have a master index of the backend system corresponding to already received messages at the time of a last message exchange between each respective mobile unit and the backend system, wherein the method comprises, when no connectivity is present between the at least two mobile units and the backend system:
  setting up, by the at least two mobile units, an ad-hoc network between the at least two mobile units,
  exchanging, by the at least two mobile units, respective local indexes, master indexes and reception indexes between the at least two mobile units,
  deleting, by a first mobile unit, an older reception index and an older master index corresponding to the first mobile unit and storing a more current reception index and a more current master index corresponding to a second mobile unit as an updated reception index and an updated master index for the first mobile unit, wherein the older reception index and the older master index corresponding to the first mobile are older than the more current reception index and the more current master index corresponding to the second mobile unit;
  updating, by the first mobile unit, locally stored messages of the first mobile unit based on the more current master index and the more current reception index; and
  transmitting, by the first mobile unit, messages additionally present in the local databases of the at least two mobile units to one or more respective other mobile units.

11. The method according to claim 10, wherein the backend system comprises a master database for storing data received from the at least two mobile units, wherein the backend system is configured to generate a master index based on the stored data received from the at least two mobile units, wherein the method further comprises, when connectivity is present between the first mobile unit and the backend system:
  receiving, by the first mobile unit, the master index from the backend system,
  deleting, by the first mobile unit, the data of the local database of the first mobile unit which are contained in the master database based on a comparison of the local index of the first mobile unit with the master index;
  updating, by the first mobile unit, the local index of the first mobile unit;
  transmitting, by the first mobile unit, data stored in the local database of the first mobile unit which are not yet contained in the master database of the backend system;
  receiving and storing, by the first mobile unit, a new master index from the backend system;
  deleting, by the first mobile unit, the transmitted data of the local database of the first mobile unit based on a comparison of the updated local index of the first mobile unit with the new master index; and
  further updating, by the first mobile unit, the local index of the first mobile unit.

12. The method according to claim 11, wherein the master index of the backend system and the local index of the first mobile unit are stored in an acknowledgement file.

13. The method according to claim 10, wherein the backend system comprises a master database for storing data received from the at least two mobile units, wherein the backend system is configured to generate a master index based on the stored data from the at least two mobile units, wherein the method further comprises, when connectivity is present between the first mobile unit and the backend system:
  transmitting, by the backend system, the master index to the first mobile unit;
  receiving, by the backend system, new data which are not contained in the master database from the first mobile unit;
  storing, by the backend system, the new data in the master database;
  updating, by the backend system, the master index based on the new data stored in the master database; and
  transmitting, by the backend system, the new master index to the first mobile unit.

14. The method according to claim 13, wherein the master index of the backend system and the local index of the first mobile unit are stored in an acknowledgement file.

15. The method according to claim 10, wherein the backend system comprises a master database for storing messages corresponding to the at least two mobile units, wherein the backend system is configured to generate a master index according to already transmitted messages, wherein the method further comprises, when connectivity is present between the at least two mobile units and the backend system:
  transmitting, by the backend system, the master index to the first mobile unit;
  receiving, by the backend system, the reception index of the first mobile unit and the local index of the first mobile unit;
  deleting, by the backend system, messages already received by the first mobile unit from the master database of the backend system based on the reception index of the first mobile unit;
  transmitting, by the backend system, messages which have not yet been received by the first mobile unit to the first mobile unit;
  receiving, by the backend system, an updated reception index of the first mobile unit from the first mobile unit;

deleting, by the backend system, the transmitted messages from the master database based on the received updated reception index of the first mobile unit; and
updating, by the backend system, the master index of the backend system.

16. The method according to claim 10, wherein the backend system comprises a master database for storing messages corresponding to the at least two mobile units, wherein the backend system is configured to generate a master index according to already transmitted messages, wherein the method further comprises, when connectivity is present between the at least two mobile units and the backend system:
receiving, by the first mobile unit, the master index of the backend system;
deleting, by the first mobile unit, messages in the local database of the first mobile unit based on the master index;
updating, by the first mobile unit, the reception index of the first mobile unit;
transmitting, by the first mobile unit, the local index of the first mobile unit and the updated reception index;
receiving, by the first mobile unit, messages which have not yet been received by the first mobile unit;
storing, by the first mobile unit, the received messages;
updating, by the first mobile unit, the reception index and the local index of the first mobile unit; and
transmitting, by the first mobile unit, the updated reception index and the local index of the first mobile unit to the backend system.

17. A system for exchanging data intended for a backend system between at least two mobile units if restricted connectivity is present between the mobile units and the backend system, the system comprising:
the at least two mobile units;
wherein the at least two mobile units each comprise a local database for storing data corresponding to each respective mobile unit;
wherein the at least two mobile units are each configured to generate a respective local index based on the respective stored data;
wherein the at least two mobile units each have a respective master index corresponding to the stored data of the backend system at the time of a last data exchange between the respective mobile unit and the backend system;
wherein the at least two mobile units are further configured for, when there is no connectivity between the at least two mobile units and the backend system:
setting up, by the at least two mobile units, an ad-hoc network between the at least two mobile units;
exchanging, by the at least two mobile units, the respective master indexes and the respective local indexes between the at least two mobile units;
deleting, by a first mobile unit, an older master index corresponding to the first mobile unit and storing a more current master index corresponding to a second mobile unit as an updated master index for the first mobile unit, wherein the older master index corresponding to the first mobile is older than the more current master index corresponding to the second mobile unit;
deleting, by the first mobile unit, data from the local database of the first mobile unit which have already been sent to the backend system, based on a comparison of the more current master index with the local index of the first mobile unit;
updating, by the first mobile unit, the local index of the first mobile unit in the local database of the first mobile unit; and
transmitting, by the at least two mobile units, additional data present in the respective local databases of the at least two mobile units to one or more respective other mobile units so that the local databases of each of the at least two mobile units comprise identical data which have not yet been sent to the backend system; and
further updating, by the at least two mobile units, the respective local indexes of the at least two mobile units.

18. A system for exchanging messages between a backend system and at least two mobile units if restricted connectivity is present between the mobile units and the backend system, the system comprising:
the at least two mobile units;
wherein each mobile unit comprises a local database for storing messages;
wherein each mobile unit is configured to generate a local index according to the locally stored messages;
wherein each mobile unit is configured to generate a reception index according to already received messages;
wherein the at least two mobile units each have a master index of the backend system corresponding to already received messages at the time of a last message exchange between each respective mobile unit and the backend system;
wherein the at least two mobile units are further configured for, when there is no connectivity between the at least two mobile units and the backend system:
setting up, by the at least two mobile units, an ad-hoc network between the at least two mobile units,
exchanging, by the at least two mobile units, respective local indexes, master indexes and reception indexes between the at least two mobile units,
deleting, by a first mobile unit, an older reception index and an older master index corresponding to the first mobile unit and storing a more current reception index and a more current master index corresponding to a second mobile unit as an updated reception index and an updated master index for the first mobile unit, wherein the reception index and the master index corresponding to the first mobile are older than the more current reception index and the more current master index corresponding to the second mobile unit;
updating, by the first mobile unit, locally stored messages of the first mobile unit based on the more current master index and the more current reception index; and
transmitting, by the first mobile unit, messages additionally present in the local databases of the at least two mobile units to one or more respective other mobile units.

* * * * *